Jan. 23, 1962  W. E. PORTZ ET AL  3,018,140
ADHESIVE CONNECTION FOR TOOL HANDLE
Filed May 12, 1959

INVENTORS
William E. Portz
BY George W. Yearley
Slough & Slough
ATTORNEYS

United States Patent Office 3,018,140
Patented Jan. 23, 1962

3,018,140
ADHESIVE CONNECTION FOR TOOL HANDLE
William E. Portz, Geneva, and George W. Yearley, North Madison, Ohio, assignors to True Temper Corporation, Cleveland, Ohio, a corporation of Ohio
Filed May 12, 1959, Ser. No. 812,725
5 Claims. (Cl. 306—22)

Our invention relates to handled tools and relates more particularly to tools of the type, such as hoes, having a tool shank and an elongated handle therefor, the invention relating particularly to improved means for assembling said tools and to an improved and simplified connection between the tool head and the handle therefor.

An object of our invention is to provide an inexpensive easy assembly of such tools.

Another object of our invention is to provide means for attaching the tool head to a handle therefor wherein the shank will remain in prearranged order within the connection during attachment.

A still further object of our invention is to provide in tools of the character described a very firm and strong connection between the tool shank and the handle.

A further object of our invention is to provide a tubular socket for the handle and shank of the tool having reinforcing means in the area in which they are most likely to break, viz. the shank connection.

Another object of our invention is to provide a closed end socket for centering the shank of a tool during adhesive connection to the handle or sleeve extension of the handle and for reception therefor.

Other objects of our invention and the invention itself will become more readily apparent by reference to the accompanying description and appended drawings.

Figure 1:
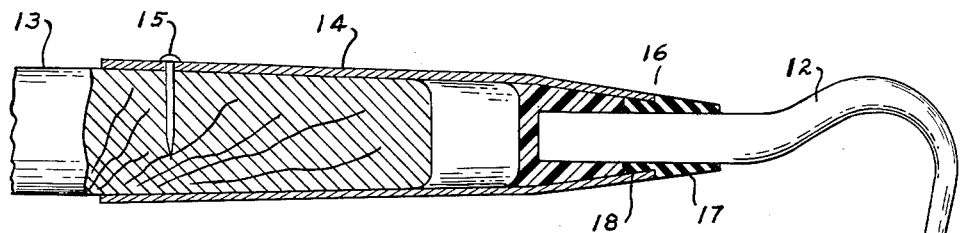
FIG. 1 is a transverse longitudinal view of an embodiment of our invention leaving the shank of the tool and the tool head unsectioned, a portion of the handle being broken away.
Figure 2:
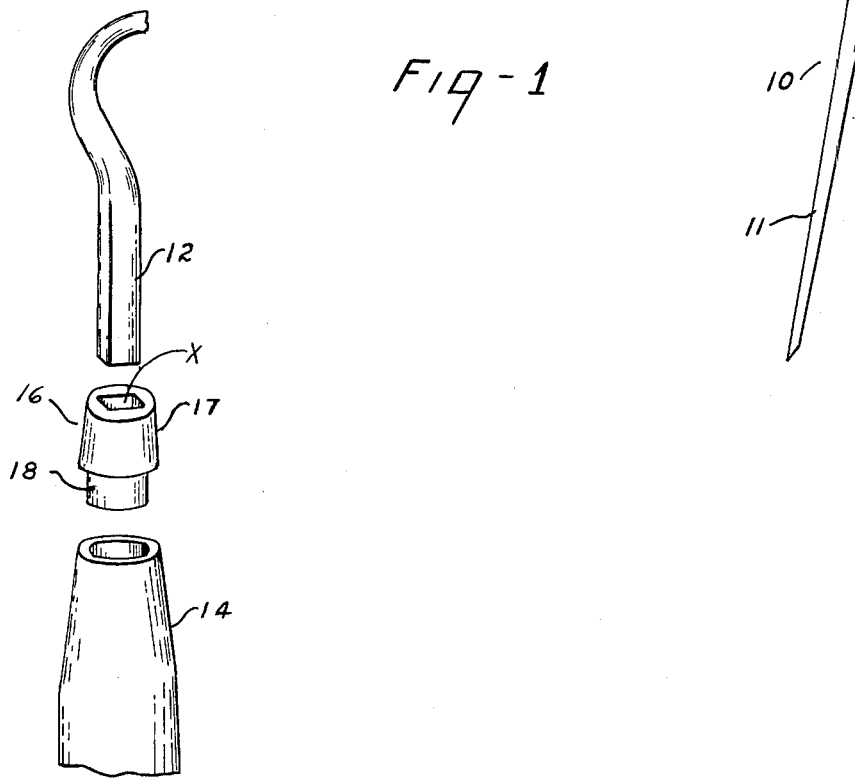
FIG. 2 is an exploded view of several elements of our invention.

Referring now to the drawings in all of which like parts are designated by like reference characters, at 10 a work tool is shown which, while not limited thereto, in the form of our invention herein illustrated, is a hoe having a blade 11, a shank 12 disposed transversely to said blade and integrally formed therewith, and adapted to be provided with a handle, as hereinafter related.

At 13 a handle for said tool is shown, said handle in the form shown being a wooden handle, although it is to be understood that said handle may be metallic, fibre glass, or other preferred material. A sleeve 14 is telescoped over an end of the handle 13, which may be press fitted therein and additionally secured as by rivet or other attachment 15 or otherwise secured thereto. It is to be noted that the handle 13 is disposed in spaced relation to the shank 12 of the tool which enters the tubular sleeve 14 at an opposite end thereof and that the said shank 12 is retained in centered position within said opposite end of the sleeve 14 by means of a ferrule 16. The shank is further adhesively bonded to the sleeve and to the ferrule by means of an epoxy resin or other adhesive material which is inserted into the sleeve prior to the insertion of the handle 13 therein, after the ferrule enclosed shank 12 of the tool has been inserted into said sleeve and secured thereto by means of the ferrule 16. The ferrule 16, preferably formed of a flexible material, such as rubber, etc. preferably comprises a larger diameter annular portion 17 and a relatively stepped down smaller diameter annular portion 18, the portion 18 being compressively inserted within the end walls of the sleeve 14 and the portion 17 abutting the ends of the said sleeve and forming a closed seat or closed socket therefor with the inserted shank for the reception of the adhesive or other bonding material, such as an epoxy resin, preferably of the thermo-setting type, as a combination of polyamide and epoxy resins, etc. The adhesive may be poured into the sleeve and completely encircle the shank of the tool, or may be of solid material adapted on heating to become fluid and to encircle such shank.

In practice, after the epoxy resin or other adhesive is inserted to adhesively bind the walls of the sleeve and the shank together, the handle 13 is inserted within the sleeve at the upper end thereof, the adhesive containing portions of the tube and the shank may be heated, if necessary as for certain epoxies, to set the epoxy bond or otherwise cured, etc. and the end of the sleeve and the handle 13 is secured together.

The sleeve thus acts as a common connector for the handle and the tool head and the shank and the ferrule acts as a centering device for the shank and as a closed seat or socket for the epoxy which bonds the shank and sleeve extension of the handle together. It will be noted that the replacement of handles can be readily and simply effected further without impairing the tool head connection.

It will be further understood that various tool heads may be secured to handles or provided with replacement handles, etc. in the manner indicated above in connection with the preferred embodiment herein illustrated, and described, which relates to a hoe, and that the shank may be of different formations, the present shank being shown as square in the portion which is inserted within the sleeve and the opening in the ferrule, the ferrule being provided with a rectangular opening "x" to accommodate such squared end of the shank, and that the dimensions of the tool, handle, connection, etc. may be changed without, however, departing from the spirit of our invention or the scope of the appended claims.

What we claim is:

1. In a handled tool, the combination with an elongated handle, a tubular metallic sleeve therefor and secured thereto, said tool having a work edge and a shank, a ferrule telescoped over the shank of the tool, a portion of said tool shank projecting therethrough into the sleeve and encircled thereby, the shank being circumferentially spaced throughout its sleeve encircled portion from the sleeve, said ferrule being provided with portions of lesser and greater diameters, said portion of lesser diameter being wedgingly disposed within the said sleeve and said portion of greater diameter abutting the outer end of said sleeve acting as a centering device for said shank during attachment, adhesive material disposed within said space between said shank and said sleeve to secure said shank to said sleeve, the handle being secured within the opposite end of said sleeve.

2. In a handled tool, the combination with an elongated handle, a tubular metallic sleeve therefor, said tool having a work edge and a shank, a ferrule telescoped over the shank of the tool, a portion of said tool shank projecting therethrough into the sleeve and encircled thereby, the shank being circumferentially spaced throughout its sleeve encircled portion from the sleeve, said ferrule being provided with portions of lesser and greater diameters, said portion of lesser diameter being wedgingly disposed within the said sleeve and said portion of greater diameter abutting the outer end of said sleeve, fluid adhesive material disposed within the recited space between the sleeve and tool shank bonding the said sleeve and said shank sleeve encircled portion together, the ferrule portion of lesser diameter abutting said material and an end of the sleeve, the said sleeve and ferrule acting as a centering device for said shank during attachment, the handle being secured within an opposite spaced end of said sleeve.

3. In a handled tool, the combination with an elongated handle, a tubular metallic sleeve therefor, said tool having a work edge and a shank portion, a ferrule telescoped over the shank of the tool, a portion of said shank projecting therethrough into the sleeve and encircled thereby, the shank being circumferentially spaced throughout its sleeve encircled portion from the sleeve, said ferrule being wedgingly disposed between the said sleeve and the shank and together with the shank portion totally closing the said shank end of said sleeve and acting as a centering device for said shank during attachment, adhesive material disposed within said space between said shank and said sleeve to secure said shank to said sleeve, the handle being secured within the opposite end of said sleeve.

4. In a handled tool, the combination with an elongated handle, a tubular metallic sleeve therefor, said tool having a work edge and a shank portion, a ferrule telescoped over the shank of the tool, said sleeve having an inwardly tapered portion adjacent its forward end, said ferrule having a pair of tapered portions, a more forwardly disposed of said tapered portions of the ferrule being of greater cross-sectional dimension that a more rearwardly disposed of said tapered portions thereof, a portion of said shank projecting into the tapered portion of said sleeve and encircled thereby, the shank being circumferentially spaced throughout its sleeve encircled portion from the said sleeve, the more forwardly disposed portion of said ferrule abutting the outermost end of said tapered sleeve and said more rearwardly disposed tapered portion of the ferrule being wedgingly and compressively fitted within the internally disposed surfaces of said tapered sleeve portion, adhesive means adhesively securing the shank within the tapered portion of said sleeve, said adhesive material bonding said shank, ferrule and sleeve to form an integral attachment of said tool and sleeve, the elongated handle for the tool being telescoped within an opposite end of said sleeve, securing means securing said handle to said sleeve in longitudinally spaced relation to the shank of said tool.

5. In a handled tool, the combination with a handle, a tubular sleeve therefor, said tool having a work edge and a shank portion, a ferrule telescoped over said shank, said ferrule being secured to the end of said sleeve, said shank and sleeve portion being in concentrically spaced relation to each other, said ferrule having a portion thereof disposed between said sleeve and said shank, adhesive means disposed within said space adhesively securing said shank and said sleeve together, the handle being secured within the opposite end of said sleeve.

References Cited in the file of this patent

UNITED STATES PATENTS

| 2,039,926 | Paradise | May 5, 1936 |
| 2,103,442 | Bartosz | Dec. 28, 1937 |
| 2,133,871 | Reed | Oct. 18, 1938 |
| 2,656,225 | Saylor | Oct. 20, 1953 |
| 2,678,853 | Reeder | May 18, 1954 |

FOREIGN PATENTS

| 70,589 | Denmark | Feb. 6, 1950 |